United States Patent [19]
Kaji et al.

[11] Patent Number: 5,249,042
[45] Date of Patent: Sep. 28, 1993

[54] ELECTRONIC COLOR SCREENING SYSTEM USING COLOR-DEPENDENT TRIGONOMETRIC FUNCTIONS

[75] Inventors: Mitsuo Kaji; Miki Ishihara, both of Tokyo, Japan

[73] Assignee: NEC Corporation, Japan

[21] Appl. No.: 763,372

[22] Filed: Sep. 20, 1991

[30] Foreign Application Priority Data

Sep. 21, 1990 [JP] Japan .................. 2-252342

[51] Int. Cl.⁵ .............................. H04N 1/46
[52] U.S. Cl. ........................ 358/500; 355/32
[58] Field of Search ................... 358/75–80; 355/32, 35, 33

[56] References Cited

U.S. PATENT DOCUMENTS 4,970,586 11/1990 Sunda et al. ............ 358/75
5,055,923 10/1991 Kitagawa et al. ........ 358/75

FOREIGN PATENT DOCUMENTS

61-186077 8/1986 Japan .

Primary Examiner—Stephen Brinich
Attorney, Agent, or Firm—Ostrolenk, Faber, Gerb & Soffen

[57] ABSTRACT

Color video signals representing gradation values of yellow, magenta, cyan and black components of a halftone original are stored into respective video memories (4) and matrix patterns of screen values are stored in respective areas of a screen memory (7) corresponding to the colors of the video signals. Each matrix pattern has repeating areas extending in a direction inclined to the orientation of the original at an angle $\phi$ which satisfies $\tan \phi = 1/(\tan \theta + \cot \theta)$. Each of the color signals is retrieved from the video memories (4) at line intervals depending on the screen angle $\theta$ so that if the video signal is reconstructed on a hypothetical plane the line starting points of a resultant image would substantially delineate a line path that is inclined to the orientation of the original by an amount corresponding to the screen angle $\theta$ of the color of the video signal. The screen values of each matrix pattern are repeatedly retrieved corresponding to the color of the video signal and compared with the retrieved video signal to produce print signals.

12 Claims, 11 Drawing Sheets

YELLOW
($\theta_y = 0°$, $\tan \phi_y = 0$)

MAGENTA
($\theta_m = 15°$, $\tan \phi_m = 1/4$)

CYAN
($\theta_c = -15°$, $\tan \phi_c = -1/4$)

BLACK
($\theta_k = 45°$, $\tan \phi_k = 1/2$)

ELECTRONIC COLOR SCREENING SYSTEM USING COLOR-DEPENDENT TRIGONOMETRIC FUNCTIONS

BACKGROUND OF THE INVENTION

The present invention relates generally to electronic printing systems, and more specifically to an electronic screening system for halftone color images.

As described in Japanese Provisional Specification (Tokkaisho) 61-186077, an electronic screening system comprise a color scanner that scans a color halftone original to produce digital video signals, one for each different colors, yellow, magenta, cyan and black. The color video signals are respectively stored in video memories. For screening the stored video signals, an electronic equivalent of photographic screens is overlaid on the video image of the corresponding color at an angle called "screen angle" relative to the orientation of the underlying image. Electronic screens are represented by "screen values", and different matrices of screen values are prepared for the different screen angles and stored in a screen memory as decision thresholds. To reduce the size of the screen memory, screen values are selected from adjoining repeating areas. In a read mode of the system, each video memory is accessed line-by-line and the screen memory is repeatedly accessed to compare the gradation value of the retrieved video signal with the screen value pixel-by-pixel to produce a black dot signal or a white dot signal depending on the relative magnitudes of the compared values. The dot signals are used to reconstruct images in an output memory one for each of the different colors and supplied to a printing device in which the reconstructed color images are overlaid one upon another to produce a replica of the halftone color original.

It is known in the art of photographic screen printing that the best screen angle at which Moire fringe patterns are much less visible is 0° for yellow, 15° for magenta, −15° for cyan, and 45° for black with respect to the direction of line shift. Since it is impossible to implement the screen angles precisely at 15° and −15°, the screen angle of the prior art system is 18.5° for magenta and −18.5° for cyan for practical purposes. However, deviations from these ideal screen angles are a potential source of undesirable Moire fringe patterns. One approach would be to use rational tangent values to approximate the ideal screen angles with resultant large and differing matrix sizes for different colors which produce Moire fringe patterns in the printed image.

SUMMARY OF THE INVENTION

It is therefore an object of the present invention to provide an electronic screening system which implements the ideal screen angles using color-dependent trigonometric functions.

According to the present invention, a color original is scanned in raster form to produce color signals representing a gradation value of decomposed color components; yellow, magenta, cyan and black, respectively. The color video signals are respectively stored into video memories. A plurality of matrix patterns of screen values are stored in a screen memory in respective areas corresponding to the decomposed color components. Each matrix pattern has repeating areas extending in a direction inclined to the orientation of the original at an angle $\phi$ which satisfies the relation $\tan \phi = 1/(\tan \theta + \cot \theta)$. In a read mode of the system, each of the color signals are retrieved from the video memories at line intervals depending on the screen angle $\theta$ so that when the video signal is reconstructed on a hypothetical plane the line starting points of a resultant image of the video signal would substantially delineate a line path that is inclined to the orientation of the original by an amount corresponding to the screen angle $\theta$ of the color of the video signal. The screen values are retrieved from each of the matrix patterns of the screen memory corresponding to the color of the video signal. The gradation values of the retrieved color signals are then compared with the retrieved screen values to produce one of two discrete values depending on the relative magnitudes of the compared values. Specifically, $\tan \phi$ is equal to 0, $\frac{1}{4}$, $-\frac{1}{4}$ and $\frac{1}{2}$ for the yellow, magenta, cyan and black components, respectively.

BRIEF DESCRIPTION OF THE DRAWINGS

The present invention will be described in further detail with reference to the accompanying drawings, in which.

DETAILED DESCRIPTION

Figure 1:
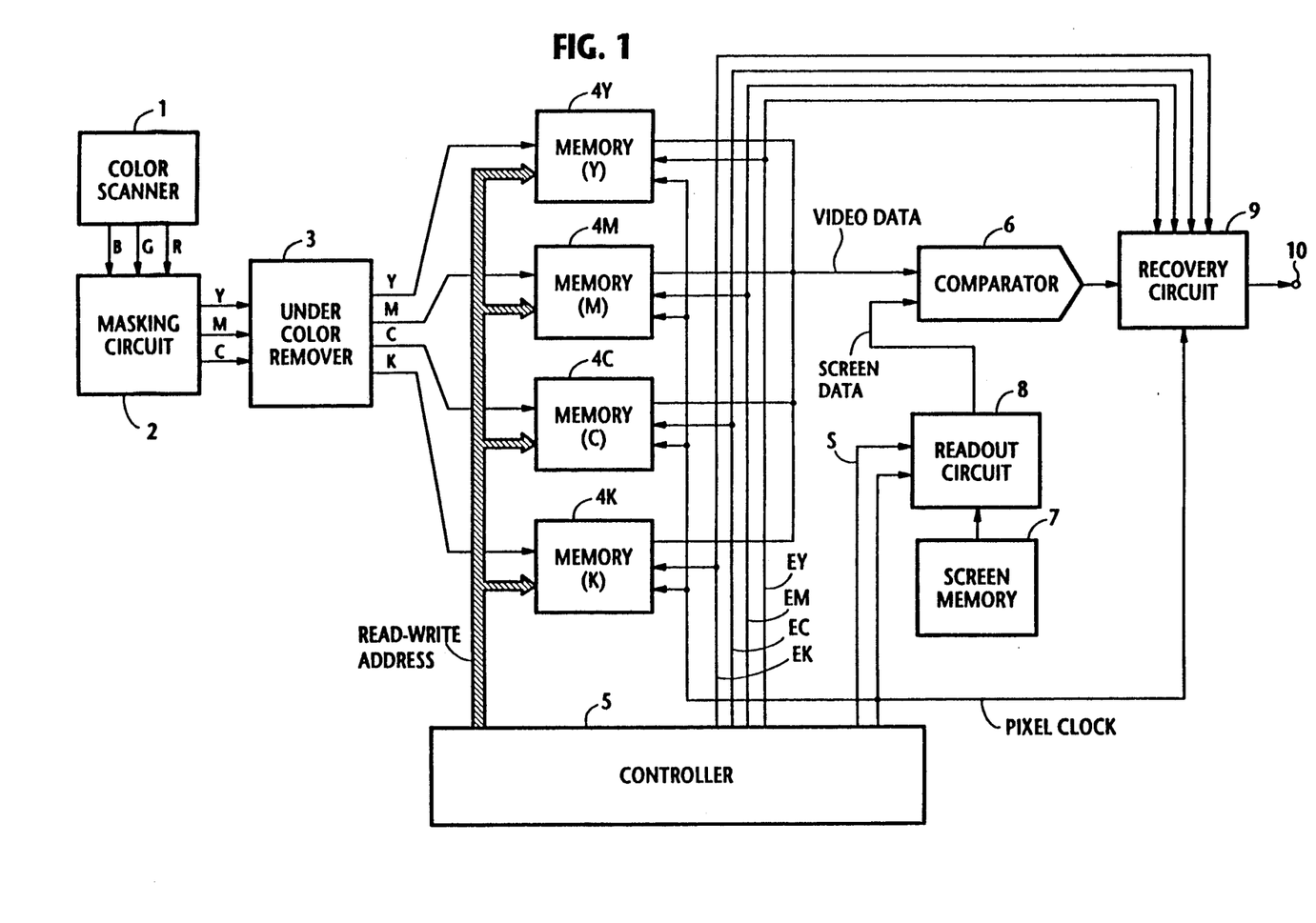
FIG. 1 is a block diagram of an electronic screening system according to the present invention.

Referring now to FIG. 1, there is shown an electronic screening system according to the present invention. The system comprises a known color scanner 1 which scans a halftone color original along each of a plurality of line paths and successively shifts the line to the next and produces three analog video signals, one for each primary color; red, green and blue. The analog video signals are sampled at periodic clock intervals and converted to corresponding primary color digital signals.

Thus, the resolution is discrete both in the direction of line scanning and the direction of line shift. The signals from scanner 1 are supplied on separate output lines R, G and B to a known masking circuit 2 in which they are mixed to produce digital complementary color signals, one for each complementary color, yellow, magenta, and cyan. The complementary color signals are supplied on output lines Y, M and C to a known undercolor remover 3 in which letterpress printing calculations are performed to remove undercolor components to produce a black signal (K) in addition to the complementary color signals on output lines Y, M, C and K. Typically, each color video signal is of 8-bit digital data representing the shade of each color with 256 gradations of tone and each video line data comprises 1000 pixels and 1000 video lines make up a color video frame. Each of the outputs of undercolor remover 3 is sequentially written into the respective video memory (first-in-first-out) in response to a write address supplied from a controller 5 during a write mode. During this write mode, pixel clock is constantly supplied to each video memory from controller 5 to access storage locations in raster form according to a write address code when that video memory is activated by an enable pulse E supplied from controller 5.

During a read mode, pixel clock is supplied to each video memory in the presence of the corresponding enable pulse E and video line data are sequentially retrieved in response to a read address code from controller 5. Each enable pulse E has a line-length interval (1000 pixel clock) and is generated at different timing for each video memory. The output of each video memory is sequentially supplied to one input of a comparator 6.

Simultaneously with the readout of each video memory, a screen memory 7, an overlying functional equivalent of photographic screen, is accessed by a readout circuit 8 to supply screen data to the other input of comparator 6 for "screening" the video data with screen values corresponding to the color of the video signal by comparison on a pixel-by-pixel basis. Comparator 6 supplies a black dot signal to a known recovery circuit 9 when the video signal has an amplitude higher than the corresponding screen value or a white dot signal when the amplitude is lower than the screen value. Recovery circuit 9 includes a frame memory and receives pixel clock from controller 5 in the presence of sequentially generated enable pulses EY, EM, EC and EK to sequentially address locations of the memory to store the dot signals from the comparator 6. The video frame stored for each color is supplied through an output terminal 10 to an external printing circuit, not shown, in which different colors are overlaid one upon another to produce a replica of the color original.

Figure 2A:
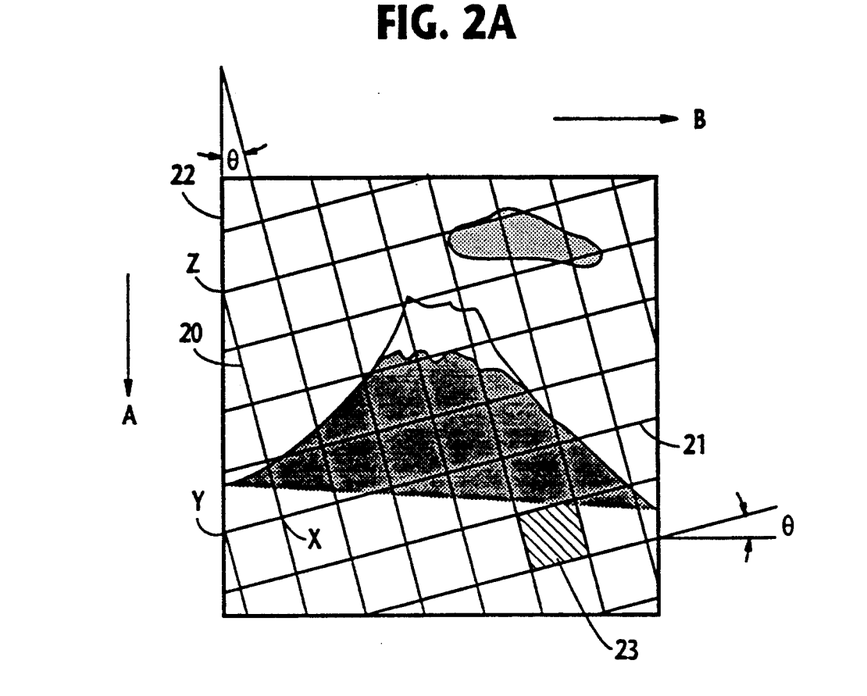
FIGS. 2A and 2B are views illustrating respectively a color original overlaid with an electronic equivalent of photographic screen and a transformed color original with the overlying screen.
Figure 2B:
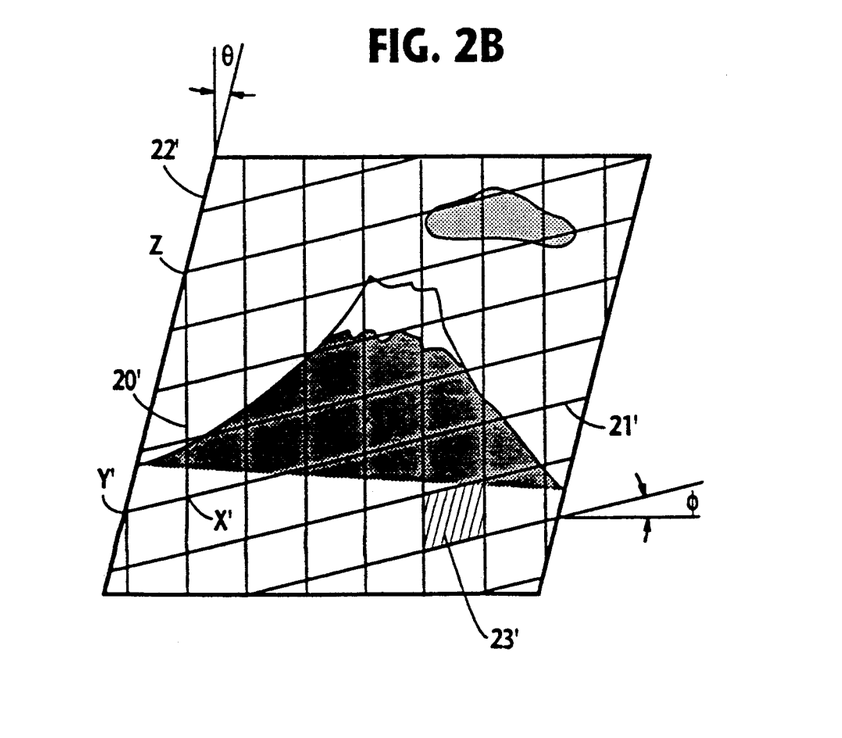

The readout of the video signals and the operation of readout circuit 8 are such that the video frame and the overlying screen, which may appear as shown in FIG. 2A in which longitudinal screen lines 20 are angulated by screen angle $\theta$ to the vertical 22 (allow A which is parallel to the direction of line shift) and transversal screen lines 21 are also angulated by $\theta$ to the horizontal (allow B which is parallel to the direction of line scanning), are transformed as shown in FIG. 2B in which longitudinal screen lines are parallel to the direction of allow A as shown at 20' and transversal screen lines are angulated by $\phi$ to the direction of allow A. This is done by introducing different delay times before starting each video line corresponding to the screen angle $\theta$ so that the starting points of all lines fall on a line 22' inclined at angle $\theta$ to the direction of allow A as shown in FIG. 2B. As a result, each unit area 23 on the original is transformed as shown at 23' on the transformed plane and their side edges vertically aligned and the top and bottom edges are skewed at angle $\phi$ to the direction of allow A. It is known that the screen angle at which periodic irregular contours (known as Moire fringe patterns) are much less visible is 0° for yellow, 15° for magenta, −15° for cyan, and 45° for black.

Figure 3:
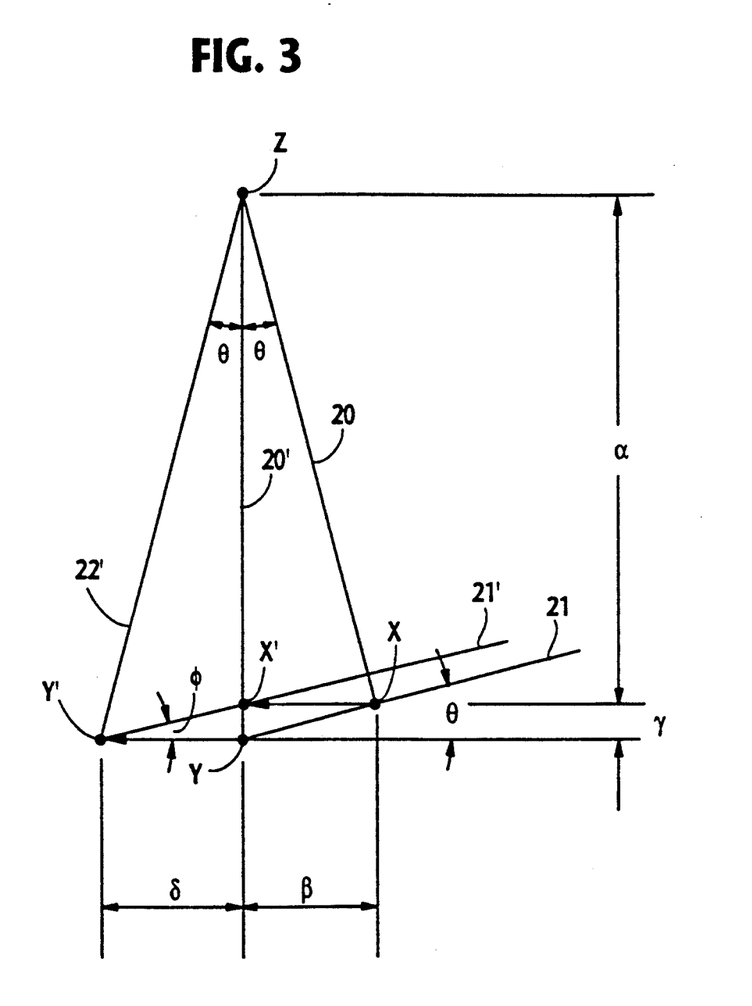
FIG. 3 is an illustration for useful for understanding the geometrical aspect of the present invention.

By examining FIGS. 2A and 2B, it will be seen that a triangle defined by apexes X, Y Z in FIG. 2A is transformed to a triangle that is defined in FIG. 2B by apexes X', Y' and Z. As seen in FIG. 3, point X is located on an intersection of screen lines 20 and 21 and is moved horizontally a distance $\beta$ to point X' that is located on the vertical 20' a distance $\alpha$ from point Z and point Y is located at a distance $\gamma$ from point X' on the vertical 22 is moved horizontally a distance $\delta$ to point Y'. Since tan $\theta = \beta/\alpha = \gamma/\beta = \delta/(\alpha+\gamma)$, the relation cot $\phi =$ cot $\theta +$ tan $\theta$ holds. Angle $\phi$ is therefore obtained from the following Equation:

$$\tan \phi = 1/(\cot \theta + \tan \theta)$$

From the above Equation, tan $\phi$ is 0 for yellow, ¼ for magenta, −¼ for cyan and ½ for black.

Figure 4:
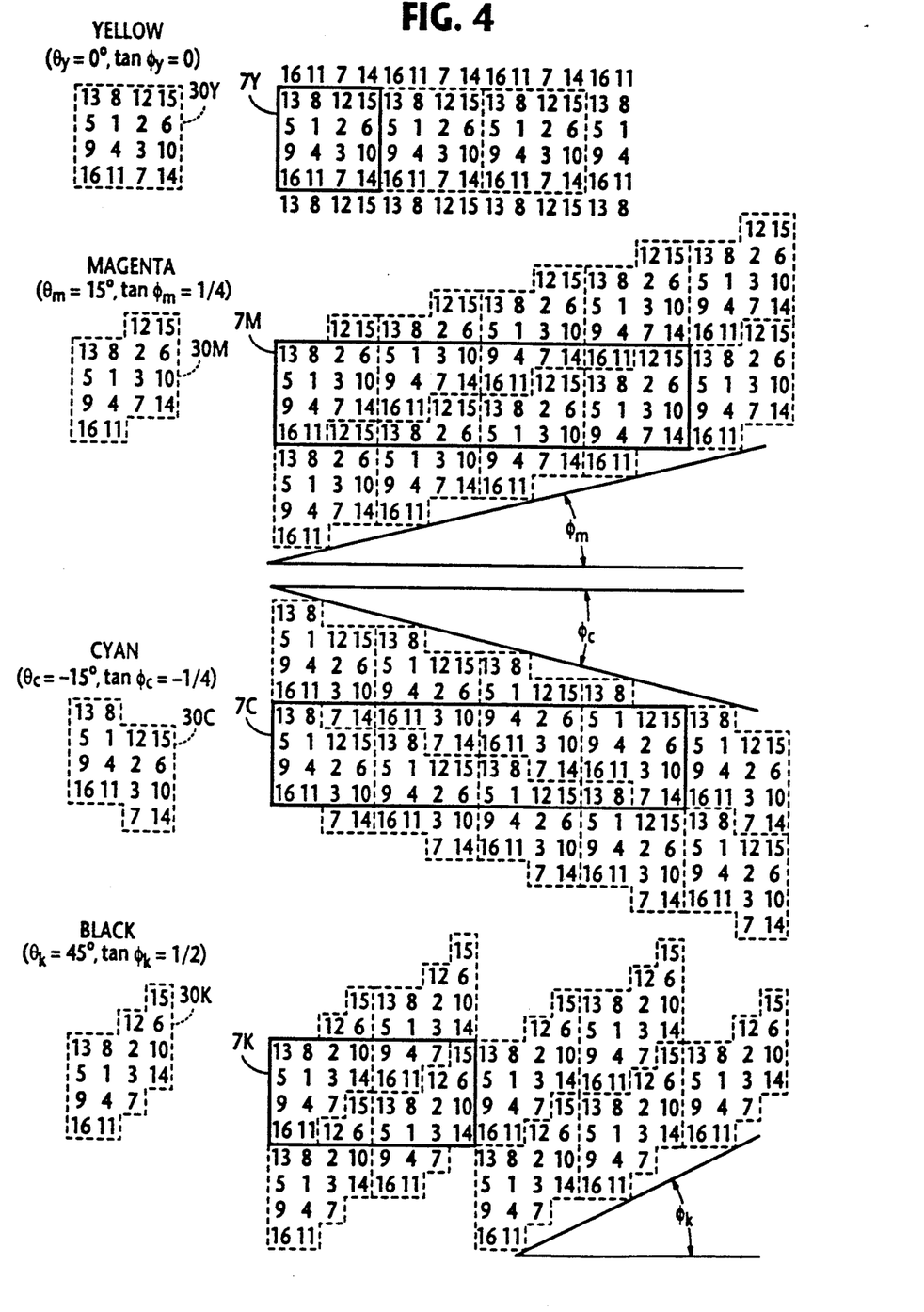
FIG. 4 is a view illustrating matrix patterns of screen values stored in the screen memory of FIG. 1.

Screen memory 7 is partitioned into four storage areas 7Y, 7M, 7C and 7K for storing four sets of screen threshold values respectively for the different colors. As shown in FIG. 4, four sets of unit areas, or repeating areas 30Y, 30M, 30C and 30K of different shape are provided for different colors respectively. Repeating area 30Y is a (4×4)-pixel basic square containing 16 different screen values and is used for yellow data for which the screen angle $\theta$ is zero and the corresponding tan $\phi$ is equal to zero. Repeating areas 30Y align themselves along a line that is parallel to the horizontal, i.e., the direction of scanning. As a typical example, smaller screen values are arranged in the inner part of the basic repeating area and greater values in the outer part. Repeating area 30M is derived from the 4×4 square 30Y by splitting it into halves along its center column axis and offsetting them by a one-line interval with respect to each other. Repeating areas 30M align themselves along a line that is inclined at a slope ratio ¼ with respect to the horizontal. Repeating area 30C is derived from the same 4×4 square by splitting it along its center column axis into halves and offsetting them by a one-line interval with respect to each other in a direction opposite to that of repeating area 30M. Repeating areas 30C align themselves along a line that is inclined at a slope ratio −¼ with respect to the horizontal. Repeating area 30K is derived from the same 4×4 square 30Y by splitting it along its column axis into three areas and successively offsetting them by a one-line interval so that the same pattern is repeated as areas 30K align themselves along a line that is inclined at a slope ratio ½ with respect to the horizontal.

Storage area 7Y of screen memory 7 corresponds to the repeating area 30Y whose screen values are compared with vide data from yellow video memory 4Y. Storage area 7M is of rectangular shape which covers 16×4 screen values. It is seen that these 16×4 screen values exist in adjacent eight repeating areas 30M and repeat themselves as they are horizontally read out of storage area 7M for comparison with video data from magenta video memory 4M. Storage area 7C is also of rectangular shape which covers 16×4 threshold values that exist in adjoining eight repeating areas 30C. These threshold values also repeat themselves as they are horizontally read out of storage are 7C for comparison with video data from cyan video memory 4C. Storage area 7K is also of rectangular shape which covers 8×4 screen values that exist in four adjoining repeating areas 30K which repeat the same pattern as they are horizontally read out of storage area 7K for comparison with video data from black video memory 4K.

Controller 5 supplies pixel clock pulses and line clock pulses S to readout circuit 8. The line clock S occurs at 2000-pixel clock intervals for a video line length of 1000 pixels and indicates the reference timing for reading each video line data out of the video memories. Pixel clock is counted by readout circuit 8 in response to the line clock S to read out screen values stored in one of the storage areas 7Y, 7M, 7C and 7K.

A detailed description of controller 5 in relation to readout circuit 8 will be given below with reference to FIGS. 5A, 5B, 6A, 6B, 7A, 7B, 8A and 8B. Video memory 4Y is first addressed during the read mode and memory 4K is last addressed.

Figure 5A:
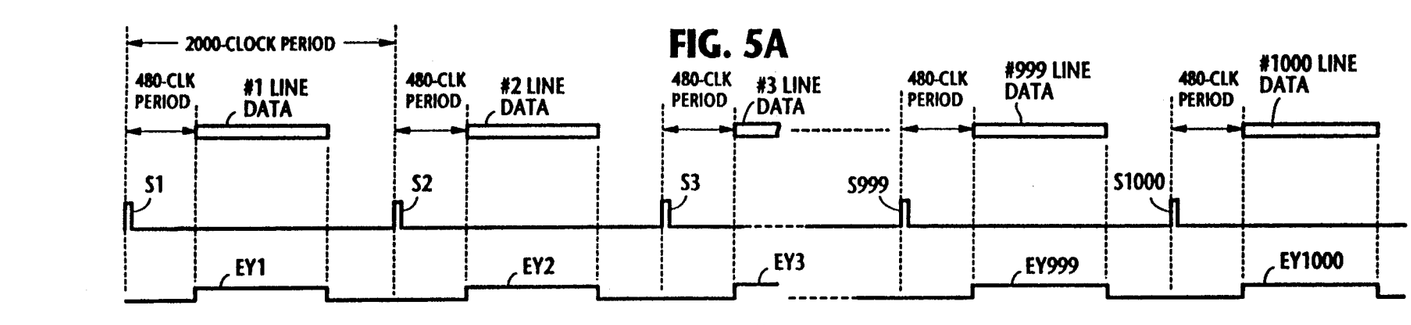
FIG. 5A is a timing diagram for line clock and enable pulses for screening the yellow component of the video signal.
Figure 5B:
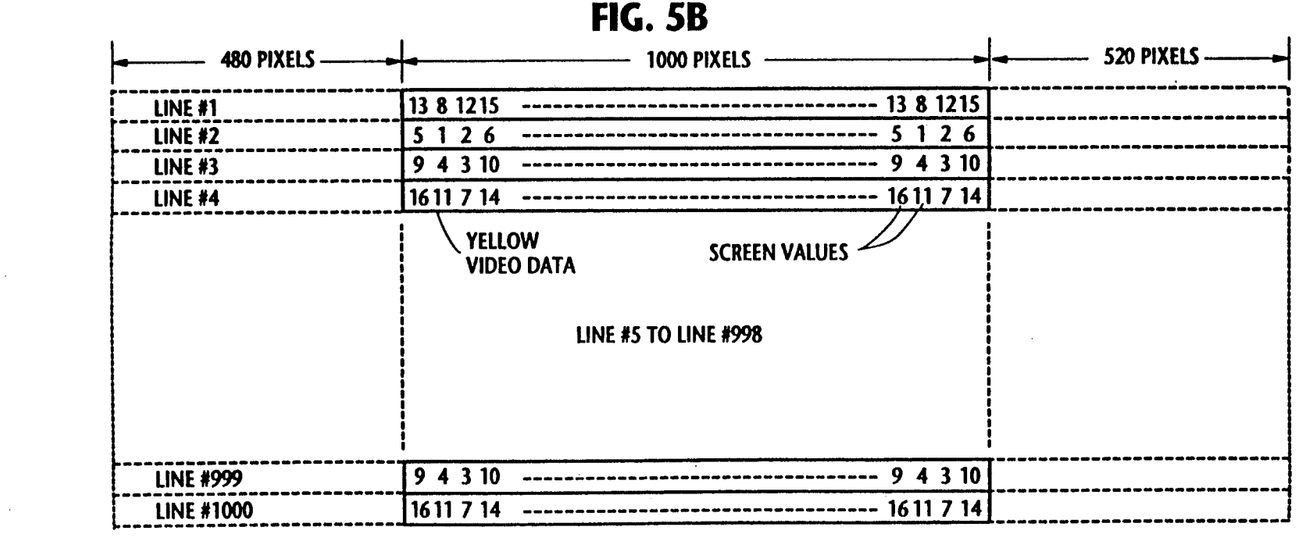
FIG. 5B is a view showing successive yellow-component video lines reconstructed on a hypothetical plane with overlying cyclic sequences of screen values.

In FIGS. 5A and 5B, line clock S1 through S1000 are sequentially generated in controller 5 at 2000 pixel-clock intervals and yellow enable pulses EY1 through EY1000 are generated respectively at the end of equal delay intervals (typically, 480-pixel clock intervals) following the corresponding line clock pulses. A successive yellow video line data is read out of memory 4Y in response to the corresponding enable pulse EY. Readout circuit 8 counts 480 pixel clock pulses from controller 5 to generate a read address for repeatedly accessing storage area 7Y, so that in response to a pixel clock S1 a cyclic sequence of screen values (13, 8, 12 and 15) are fetched from the top row of storage area 7Y until 1480 pixel clock pulses are counted and compared with yellow video data on line #1 which is read out of memory 4Y in the presence of enable pulse EY1. Therefore, if the retrieved video signal is reconstructed on a hypothetical plane having twice as long a line path as the line length of the video signal, line #1 would be overlaid with the screen values retrieved from the top row of memory area 7Y as shown in FIG. 5B. Likewise, yellow line #2 is read out of memory 4Y in response to enable pulse EY2 and compared with a cyclic sequence of screen values (5, 1, 2 and 6) which are fetched from the second row of storage area 7Y in response to a 480 count of pixel clock following line clock S2. Similar processes continue until line clock pulse S1000 is generated by controller 5 for making a comparison between the last line data and a cyclic sequence of screen values which are read out of the bottom row of storage area 7Y. Therefore, the line starting points of the yellow-component image reconstructed on a hypothetical plane would align on a path parallel to the direction of line shift corresponding to the screen angle $\theta = 0°$.

Figure 6A:
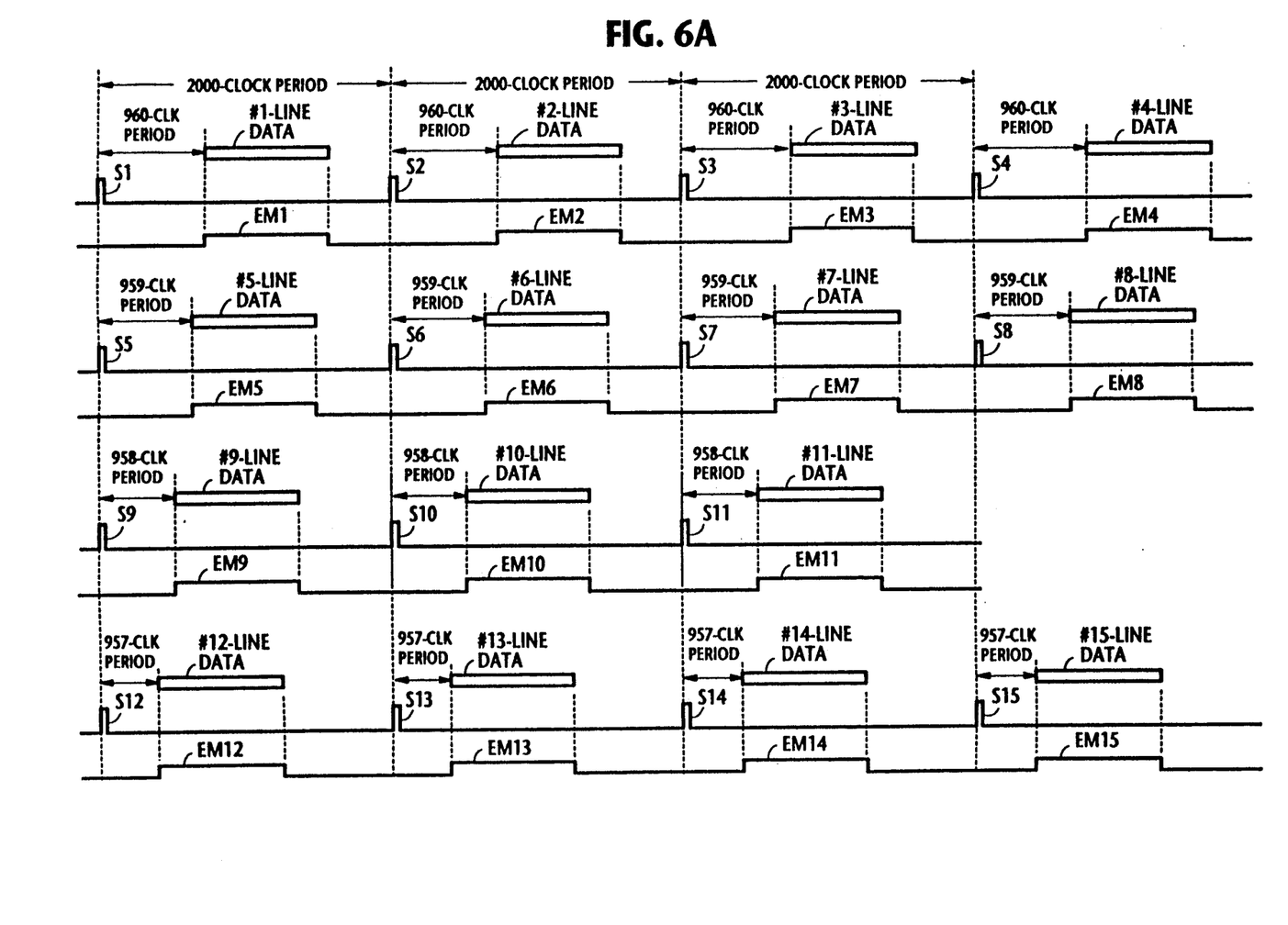
FIG. 6A is a timing diagram for line clock and enable pulses for screening the magenta component of the video signal.
Figure 6B:
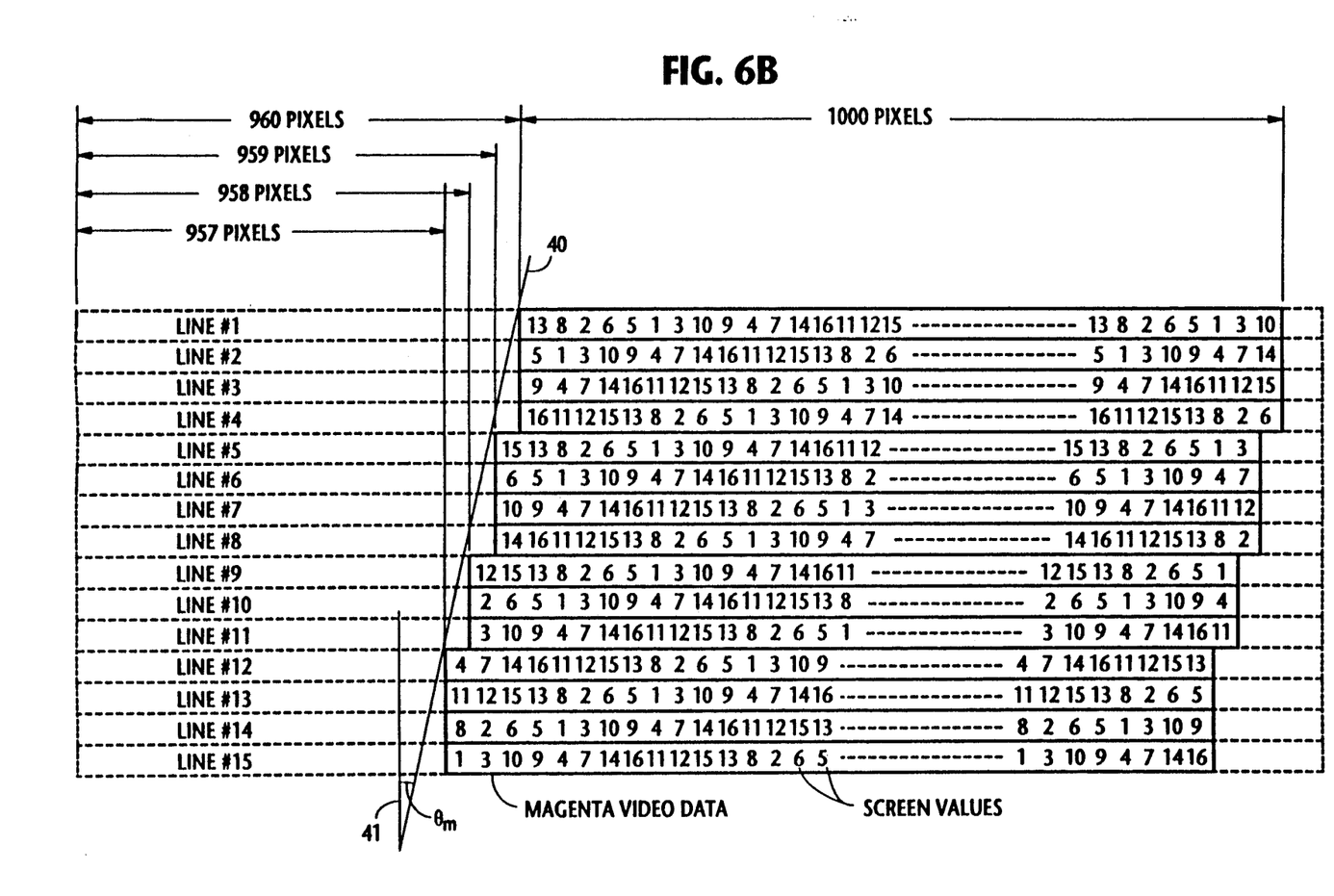
FIG. 6B is a view showing successive magenta-component video lines reconstructed on a hypothetical plane with overlying cyclic sequences of screen values.

In FIGS. 6A and 6B, the read operation for magenta signals comprises four cycles. In the first cycle, magenta enable pulses EM1 through EM4 are sequentially generated at the end of equal delay intervals (typically, 960-pixel clock intervals) following the corresponding line clock pulses S1, S2, S3 and S4, respectively. Four magenta video lines #1 through #4 are read out of memory 4M in response to enable pulses EM1, EM2, EM3 and EM4. At the first count of 960 pixel clock, readout circuit 8 repeatedly accesses the top row of storage area 7M starting with the first (leftmost) position to fetch a cyclic sequence of screen values (13, 8, 2, 6, 5, 1, 3, 10, 9, 4, 7, 14, 16, 11, 12 and 15) for comparison with the magenta signal on line #1 as shown in FIG. 6B. Similar processes continue for lines #2, #3 and #4 for comparison with a cyclic sequence of screen values fetched from the second, third and bottom rows of storage area 7M, respectively.

In the second read cycle, four magenta video lines #5 through #8 are then read out of memory 4M in response to enable pulses EM5, EM6, EM7 and EM8 which are generated at the end of each 959-pixel clock interval following the corresponding line clock pulses S5, S6, S7 and S8, respectively. In response to a 959 count of pixel clock following line clock S5, a cyclic sequence of screen values are fetched from the top row of storage area 7M starting with a screen value (i.e., 15) stored in the rightmost position (i.e., 16th position) of the top row for screening magenta video signal on line #5. Likewise, the second, third and fourth rows of storage area 7M are repeatedly accessed in succession starting with their rightmost position for comparison with magenta line signals on lines #6, #7 and #8, respectively.

In the third read cycle, three magenta video lines #9 through #11 are retrieved in response to enable pulses EM9, EM10 and EM11 generated at the end of each 958-pixel clock interval following the corresponding line clock pulses S9, S10 and S11, respectively. In response to a 958-pixel count following line clock S9, the top row of storage area 7M is repeatedly accessed starting with the second (15th position) from the rightmost position for screening magenta video signal on line #9. Likewise, the second and third rows of storage area 7M are repeatedly accessed starting with the 15th position for comparison with signals on lines #10 and #11, respectively.

In the last read cycle, fourth magenta video lines #12 through #15 are successively retrieved in response to enable pulses EM12, EM13, EM14 and EM15 which occur at the end of each 957-pixel clock interval following the corresponding line clock pulses S12, S13, S14 and S15, respectively. In response to a 957 count of pixel clock following line clock S12, the fourth row of storage area 7M is accessed starting with the 14th position for comparison with video data on line #12. Then, the first, second and third rows of storage area 7M are repeatedly accessed in succession starting with the third from the rightmost position for comparison with signals on lines #13, #14 and #15, respectively.

The same process is repeated for lines #16 to #1000. Continuing in this way, the delay time between the line clock and the starting point of each video line data decreases by a four-pixel clock interval at 15-video line intervals. As a result, the starting points of the line video signals delineate an oblique line 40 which makes an angle $\theta_m (= 15°)$ with respect to a line 41 which is parallel to the direction of line shift as indicated in FIG. 6B. Therefore, if the retrieved magenta-component is reconstructed on a hypothetical plane, the line starting points of the magenta-component image would delineate a path inclined at the screen angle $\theta = 15°$ to the direction of line shift.

Figure 7A:
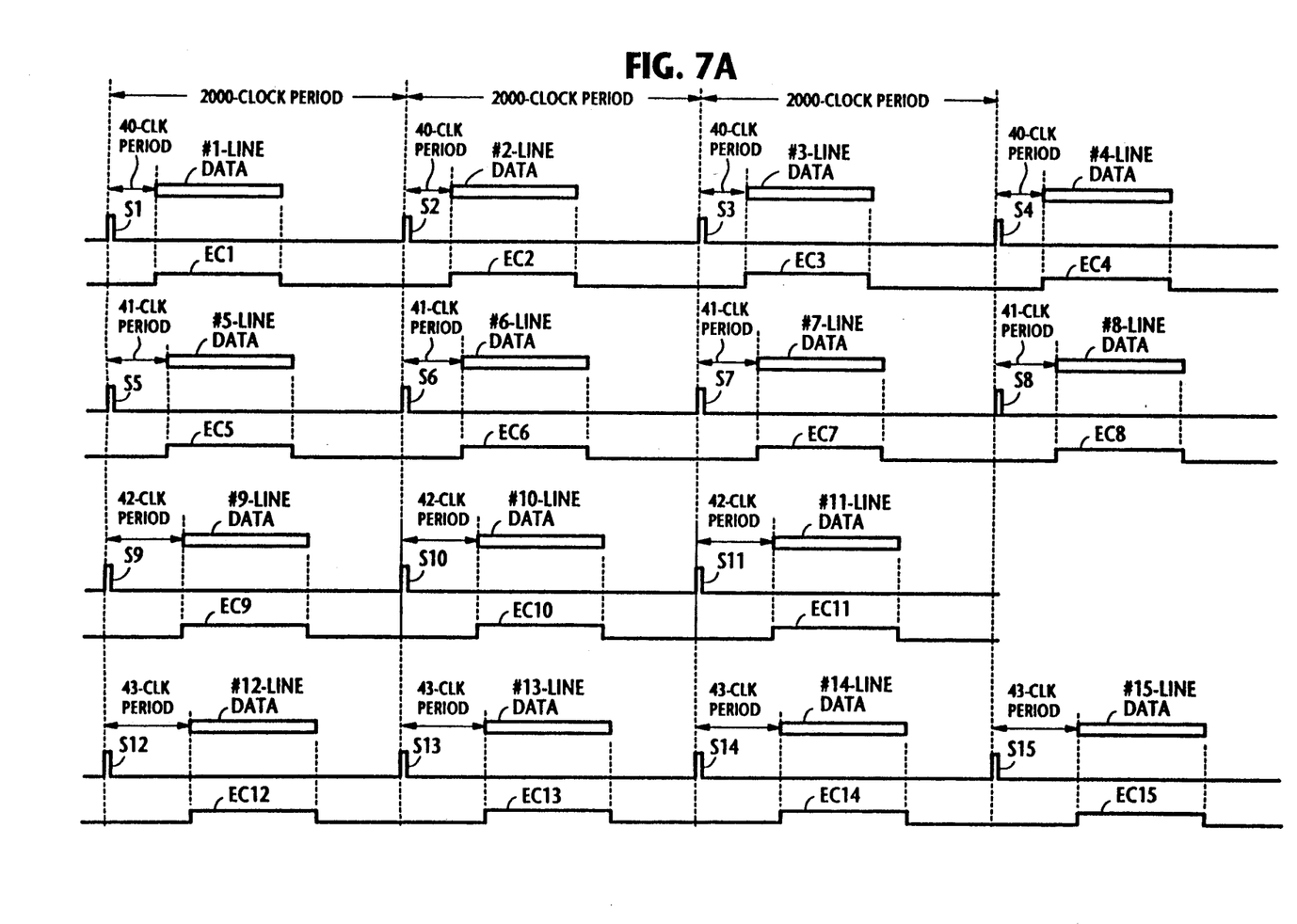
FIG. 7A is a timing diagram for line clock and enable pulses for screening the cyan component of the video signal.
Figure 7B:
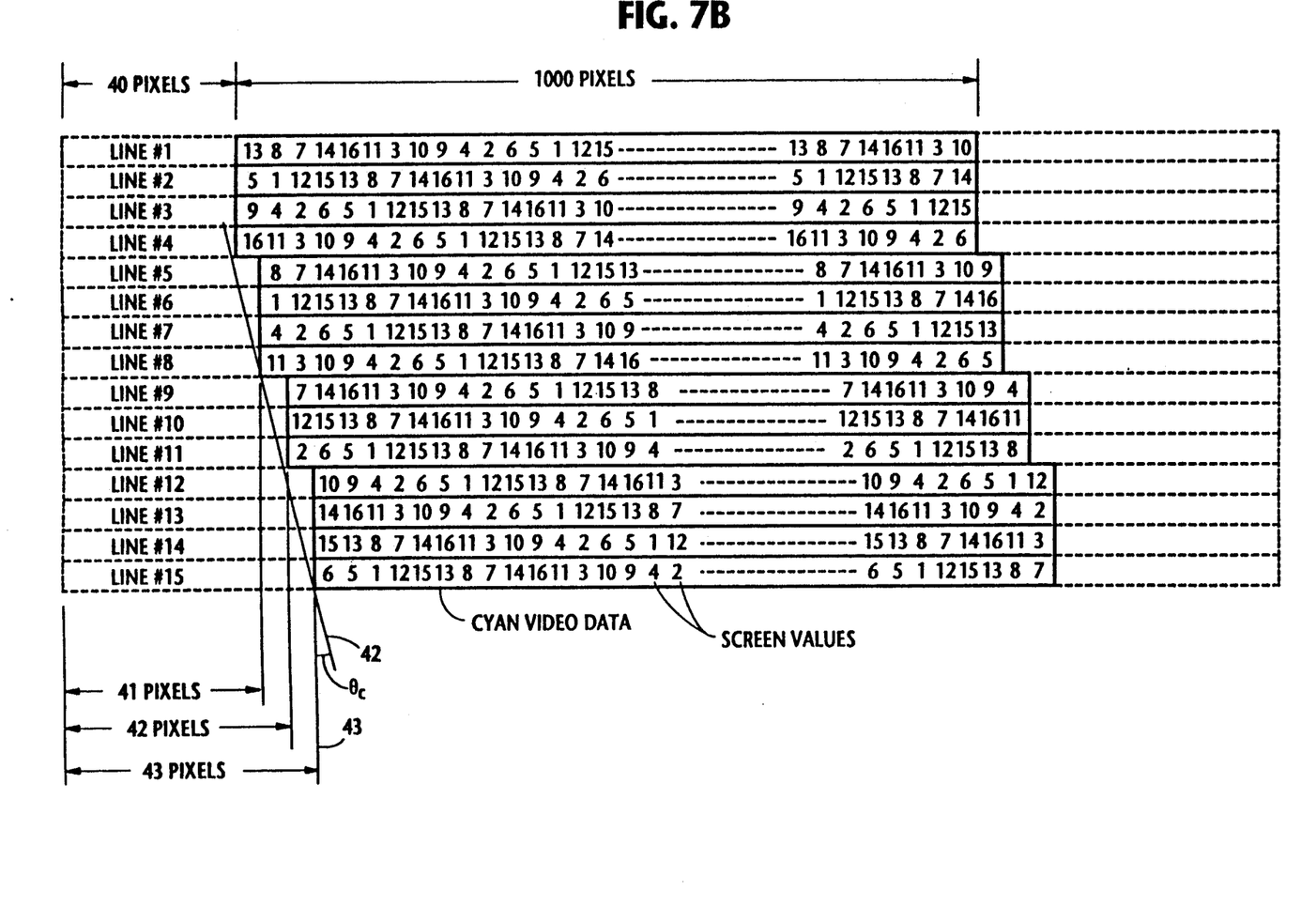
FIG. 7B is a view showing successive cyan-component video lines reconstructed on a hypothetical plane with overlying cyclic sequences of screen values.

In FIGS. 7A and 7B, the read operation for cyan components comprises four cycles as in the case of magenta. Cyan enable pulses EC1 through EC4 are sequentially generated at the end of 40-pixel clock intervals following the corresponding line clock pulses S1, S2, S3 and S4, respectively. Four cyan video lines #1 through #4 are read out of video memory 4C in response to enable pulses EC1, EC2, EC3 and EC4. At the first count of 40 pixel clock, readout circuit 8 repeatedly accesses the top row of storage area 7C starting with the first position to retrieve a cyclic sequence of screen values (13, 8, 7, 14, 16, 11, 3, 10, 9, 4, 2, 6, 5, 1, 12, 15) for comparison with the signal on line #1 as shown in FIG. 7B. Similar processes continue for lines #2, #3 and #4 for comparison with a cyclic sequence of screen values fetched from the second, third and bottom rows of storage area 7C, respectively.

In the second cyan read cycle, lines #5 through #8 are retrieved from memory 4C in response to enable pulses EC5, EC6, EC7 and EC8 which are generated at the end of each 41-pixel clock interval following the corresponding line clock pulses S5, S6, S7 and S8, respectively. In response to a 41 count of pixel clock following line clock S5, the top row of storage area 7C is repeatedly accessed starting with the second position for comparison with signal on line #5. Likewise, the second, third and fourth rows of storage area 7C are repeatedly accessed in succession starting with their second position for comparison with cyan signals on lines #6, #7 and #8, respectively.

In the third read cycle, three cyan lines #9 through #11 are retrieved in response to enable pulses EC9, EC10 and EC11 generated at the end of each 42-pixel clock interval following the corresponding line clock pulses S9, S10 and S11, respectively. In response to a 42-pixel count following line clock S9, the top row of storage area 7C is repeatedly accessed starting with the third position for comparison with signal on line #9. Likewise, the second and third rows of storage area 7C are repeatedly accessed starting with their third position for comparison with signals on lines #10 and #11, respectively.

In the last read cycle, four cyan lines #12 through #15 are successively retrieved in response to enable pulses EC12, EC13, EC14 and EC15 which occur at the end of each 43-pixel clock interval following the corresponding line clock pulses S12, S13, S14 and S15, respectively. In response to a 43-pixel count following line clock S12, the fourth row of storage area 7C is repeatedly accessed starting with the fourth position (14th position) for comparison with video data on line #12. Then, the first, second and third rows of storage area 7C are repeatedly accessed in succession starting with the third rightmost position for comparison with signals on lines #13, #14 and #15, respectively.

The same process is repeated for lines #16 to #1000, and the delay time between the line clock. It is seen that the starting point of each cyan video line data is increased by a four-pel clock interval at 15-line intervals and the starting points of the line video signals delineate an oblique line 42 which is at an angle $\theta_c (= -15°)$ with respect to the vertical 42 as indicated in FIG. 7B. Therefore, if the retrieved cyan-component is reconstructed on a hypothetical plane, the line starting points of the cyan-component image would delineate a path inclined at the screen angle $\theta = -15°$ to the direction of line shift.

Figure 8A:
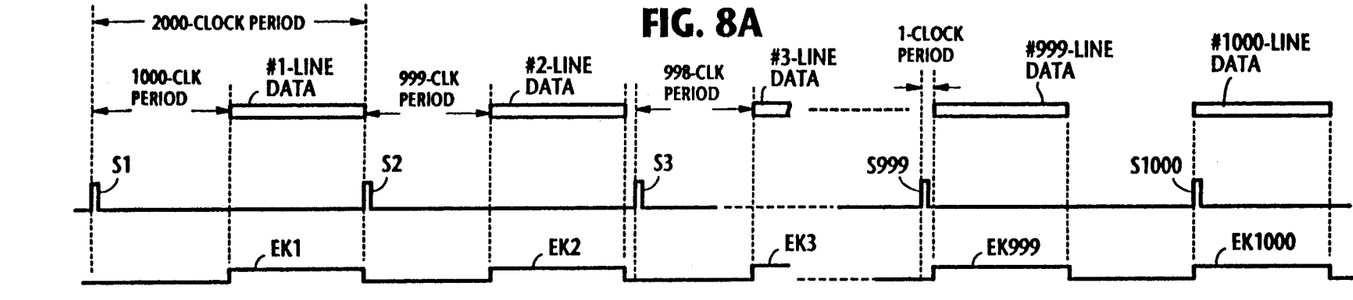
FIG. 8A is a timing diagram for line clock and enable pulses for screening the black component of the video signal.
Figure 8B:
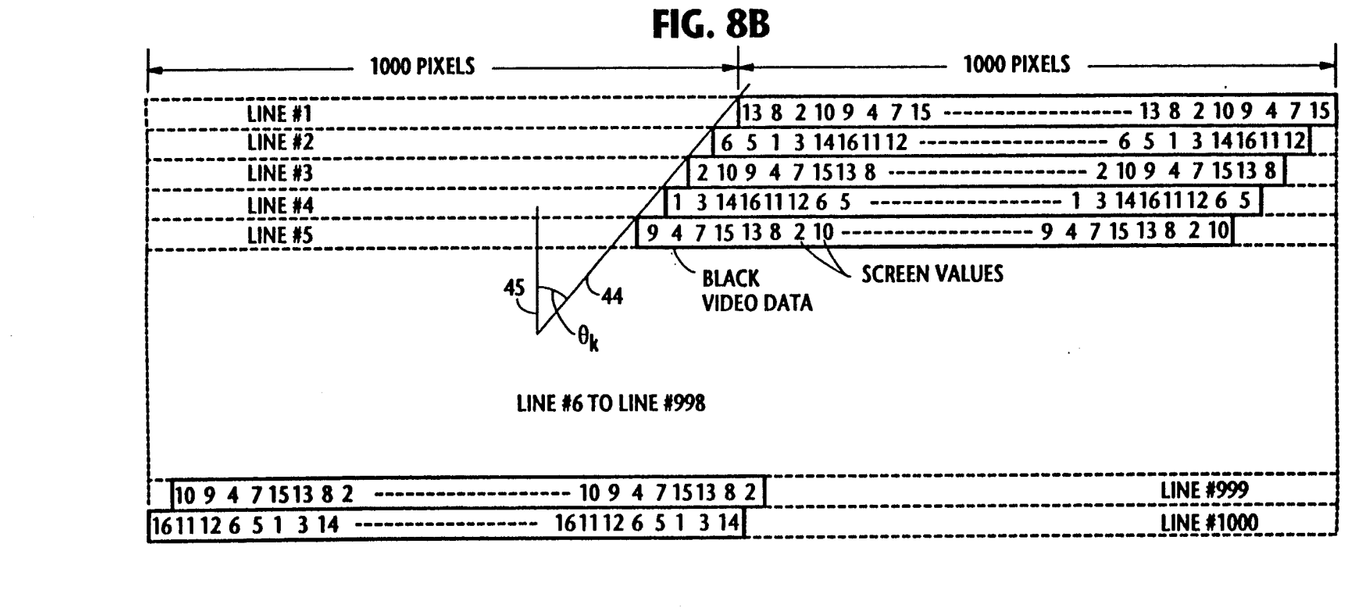
FIG. 8B is a view showing successive black-component video lines reconstructed on a hypothetical plane with overlying cyclic sequences of screen values.

In FIGS. 8A and 8B, black enable pulses EK1 through EK1000 are generated respectively at the end of different delay intervals following the corresponding line clock pulses so that the first enable pulse EK1 is delayed by a period of 1000 pixel clock pulses with respect to line clock S1 and the last enable pulse EK1000 occurs without delay in response to line clock S1000. Black line #1 is retrieved in response to enable pulse EK1 and the top row of storage area 7K is repeatedly accessed starting with the first position to fetch screen values (13, 8, 2, 10, 9, 4, 7 and 15). Black line #2 is retrieved in response to enable pulse EK2 that is delayed by a 999 clock period from line clock S2 and the second row of storage area 7K is repeatedly accessed starting with the 8th position. Black line #3 is retrieved in response to enable pulse EK3 that is delayed by a 998 clock period from line clock S3 and the third row of storage area 7K is repeatedly accessed starting with the 7th position. Similarly, black line #4 is retrieved in response to enable pulse EK4 that is delayed by a 997 clock period from line clock S4 and the bottom row of storage area 7K is repeatedly accessed starting with the 6th position, and black line #5 is retrieved in response to enable pulse EK5 and the first row of storage area 7K is repeatedly accessed starting with the 5th position. Similar processes are repeated on black video lines #6 to #1000. In this way, the starting points of black lines are delayed by one pixel interval with respect to adjacent lines, and they would describe a slant line 44 on a hypothetical plane at an angle of $\theta_k$ (=45°) with respect to the vertical 45.

Figure 9:
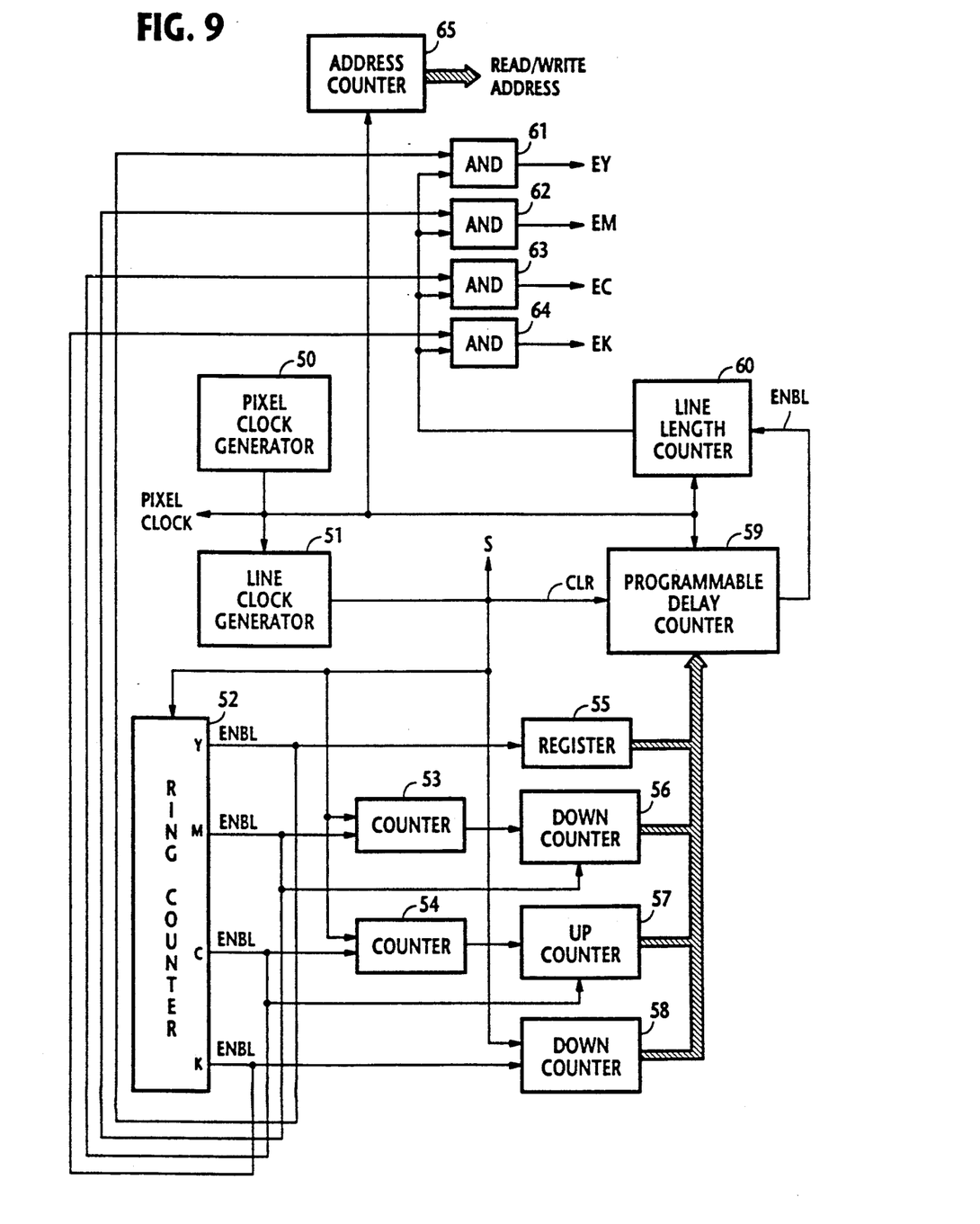
FIG. 9 is a block diagram illustrating details of the controller of FIG. 1.

One implementation of controller 5 is shown in FIG. 9. In controller 5, a pixel clock generator 50 supplies clock timing pulses corresponding to pixels in the video memories to a line clock generator 51 to generate a line clock pulse S at 2000-pixel clock intervals. The output of pixel clock generator 50 is also applied as a pixel-count input to a programmable delay counter 59 and a line length counter 60. The output of line clock generator 51 is applied as a line-count input to a ring counter 52 and as a clear pulse to programmable delay counter 59. Ring counter 52 generates an enable pulse at 1000-line intervals.

In the range of line counts 1 through 1000, ring counter 52 supplies a Y-enable pulse to a register 55 to cause it to apply a preset value (=480) to the program input of delay counter 59 for the yellow mode so that the latter produces an output at a count 480 pixel clock pulses. Line length counter 60 is enabled in response to the output of delay counter 59 to start counting the pixel clock and produces a pulse of 1000-pixel duration. The output of line length counter 60 is applied to AND gates 61, 62, 63 and 64 to which the outputs of ring counter 52 are applied, respectively. Since delay counter 59 is cleared at 2000-pixel clock intervals, a delay time of 480-pixel clock interval is introduced between each line clock pulse S and the beginning of the line-length output from counter 60 and applied through AND gate 61 to video memory 4Y as an enable pulse EY.

In the range of line counts 1001 through 2000, ring counter 52 produces an M-enable output that is applied to a counter 53 and a down-counter 56. For every fifteen successive lines, counter 53 produces a first output pulse at a count of the fourth line, a second output at a count of the eight line, a third output at a count of the ninth line and a fourth output at a count of the fifteenth line. Down-counter 56 is reset in response to the M-enable pulse to an initial program count value of 960 for the magenta mode. Down-counter 56 is responsive to the output of counter 53 as a down-count input to decrement its output count from the initial value. The output of down-counter 56 is applied to the program input of delay counter 59. Thus, the preset value of counter 59 is decremented from the initial 960-pixel count value and line length counter 60 is enabled whenever the incremented preset value is reached, producing an enable pulse EM for coupling to AND gate 62.

In the range of line counts 2001 through 3000, ring counter 52 produces a C-enable pulse that is applied to a counter 54. An up-counter 57 is initialized to a program count of 40-count value for the cyan mode in response to the C-enable pulse. In the same manner as counter 53, counter 54 drives the up-counter 57 to successively increment its output count from the initial value. The output of up-counter 57 is applied to the program input of delay counter 59, so that its preset value is decremented from the initial 40-pixel count value and line length counter 60 is enabled whenever the decremented preset value is reached, producing an enable pulse EC for coupling to AND gate 63.

In the range of line counts 3001 through 4000, ring counter 52 supplies a K-enable pulse to a down-counter 58 to cause it to produce an program count value for the black mode, which is successively decremented by one in response to each line clock pulse. Delay counter 59 is preset to the output of down-counter 58 so that the latter initially produces an enable pulse for counter 60 at the count of 1000 pixel clock pulses in response to a first line clock pulse in the black mode, allowing line length counter 60 to produce an enable pulse EK1, which is applied to AND gate 64. The program input is successively decremented in response to subsequent line clock pulses, the delay time of a subsequent enable pulse for counter 60 is decreased line-by-line until it reduces to zero.

The output of pixel clock generator 50 is further coupled to an address counter 65 which generates the read/write address code for the video memories.

What is claimed is:

1. An electronic screening system for screening decomposed color components of an original through respective electronic equivalents of photographic overlying screens each having a screen angle ($\theta$) relative to the orientation of the original, said screen angle being unique to the decomposed color of each of said components, comprising:

color signal generating means for producing color video signals representing a gradation value of yellow, magenta, cyan and black components, respectively, of pixels arranged along each of a plurality of successive line paths on said original;

a memory for storing a plurality of matrix patterns of screen values, said patterns corresponding respectively to said yellow, magenta, cyan and black components, said screen values having repeating areas extending in a direction inclined to the orientation of the original at an angle $\phi$ which satisfies a relation $\tan \phi = 1/(\tan \theta + \cot \theta)$;

control means for causing said color signal generating means to produce each of said video signals at line intervals depending on the screen angle $\theta$ of the color of the video signal so that when the video signal is reconstructed on a hypothetical plane line starting points of a resultant image of the video signal would substantially delineate a line path inclined to the orientation of the original by an amount corresponding to the screen angle $\theta$ of the color of the video signal, and repeatedly retrieving the screen values of each of the matrix patterns from said memory corresponding to the color of the video signal; and a comparator for comparing the gradation values of the retreived color signals with the retrieved screen values and producing one of two discrete values depending on relative magnitudes of the compared values.

2. An electronic screening system as claimed in claim 1, wherein $\tan \phi$ is equal to 0, $\frac{1}{4}, -\frac{1}{4}$ and $\frac{1}{2}$ for the yellow, magenta, cyan and black components, respectively.

3. An electronic screening system as claimed in claim 1, wherein the repeating areas corresponding to the different color components have the same number of identical screen values.

4. An electronic screening system as claimed in claim 1, wherein said matrix pattern contains $N \times N$ screen values for the yellow component, $4N \times N$ screen values for the magenta component, $4N \times N$ screen values for the cyan component, and $2N \times N$ screen values for the black component.

5. An electronic screening system as claimed in claim 4, wherein $\tan \phi$ is equal to 0, $\frac{1}{4}, -\frac{1}{4}$ and $\frac{1}{2}$ for the yellow, magenta, cyan and black components, respectively.

6. An electronic screening system for screening decomposed color components of an original through respective electronic equivalents of photographic overlying screens each having a unique screen angle ($\theta$) relative to the orientation of the original, said screen angle being unique to the decomposed color of each of said components, comprising:

means for scanning said original is raster form and producing color video signals representing a gradation value of yellow, magenta, cyan and black components, respectively, of successive pixels of the scanned original;

a plurality of video memories for respectively storing the color signals;

a screen memory for storing a plurality of matrix patterns of screen values, said patterns corresponding respectively to said yellow, magenta, cyan and black components, said screen values having repeating areas extending in a direction inclined to the orientation of the original at an angle $\phi$ which satisfies a relation $\tan \phi = 1/(\tan \theta + \cot \theta)$;

control means for retrieving each of the video signals from said video memories at line intervals depending ont he screen angle $\theta$ of the color of the video signal so that when the video signal is reconstructed on a hypothetical plane line starting points of a resultant image of the video signal would substantially delineate a line path inclined to the orientation of the original by an amount corresponding to the screen angle $\theta$ of the color of the video signal, and repeatedly retrieving the screen values of each of the matrix patterns from said screen memory corresponding to the color of the video signal; and a comparator for comparing the gradation values of the retrieved video signals with the retrieved screen values and producing one of two discrete values depending on relative magnitudes of the compared values.

7. An electronic screening system as claimed in claim 6, wherein $\tan \phi$ is equal to 0, $\frac{1}{4}, -\frac{1}{4}$ and $\frac{1}{2}$ for the yellow, magenta, cyan and black components, respectively.

8. An electronic screening system as claimed in claim 6, wherein the repeating areas corresponding to the different color components have the same number of identical screen values.

9. An electronic screening system as claimed in claim 6, wherein said matrix pattern contains N×N screen values for the yellow component, 4N×N screen values for the magenta component, 4N×N screen values for the cyan component and 2N×N screen values for the black component.

10. An electronic screening system as claimed in claim 6, wherein said control means comprises:
pixel clock generator means for generating a pixel clock pulse at periodic intervals;
line length counter means for counting said pixel clock pulse and producing a line length pulse of duration equal to the length of a video line;
line clock generator means for counting said pixel clock pulse and producing a line clock pulse at intervals at least twice the duration of said line-length pulse;
presettable delay counter means having a controllable preset value for counting said pixel clock pulse in response to said line clock pulse and enabling said line length counter means to produce said line length pulse when said preset count value is reached;
means responsive to said line clock pulse for determining said preset value of the delay counter means in accordance with a count value of said line clock pulse; and
means for selectively applying said line length pulse to said video memories in accordance with said count value of the line clock pulse.

11. An electronic screening system as claimed in claim 10, further comprising a recovery circuit coupled to said video memories for reconstructing each of the retrieved video signals on a memory plane in response to said pixel clock pulses in the presence of said line length pulse.

12. An electronic screening system as claimed in claim 9, wherein $\tan \phi$ is equal to 0, $\frac{1}{4}, -\frac{1}{4}$ and $\frac{1}{2}$ for the yellow, magenta, cyan and black components, respectively.

* * * * *